Patented Feb. 27, 1923.

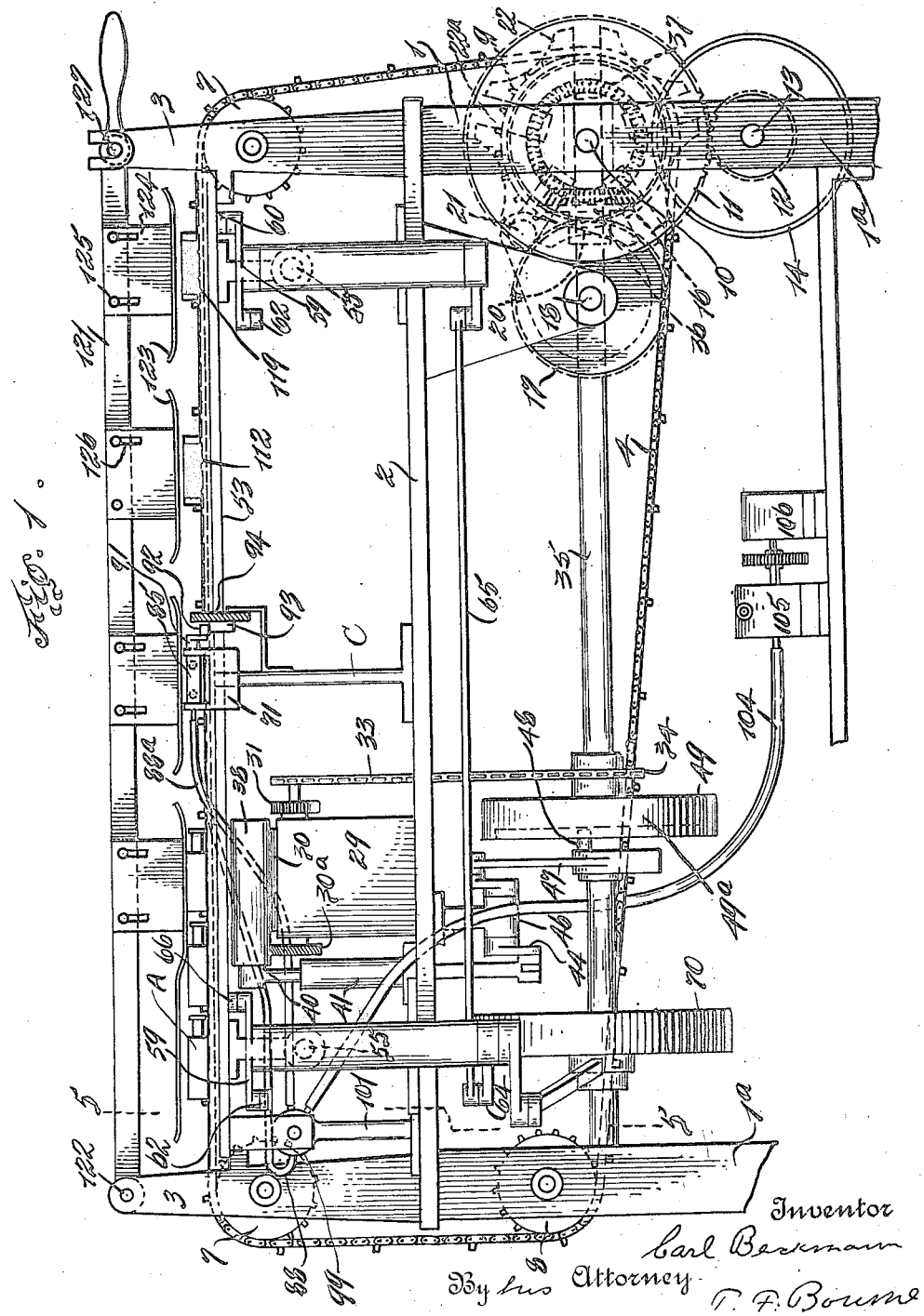

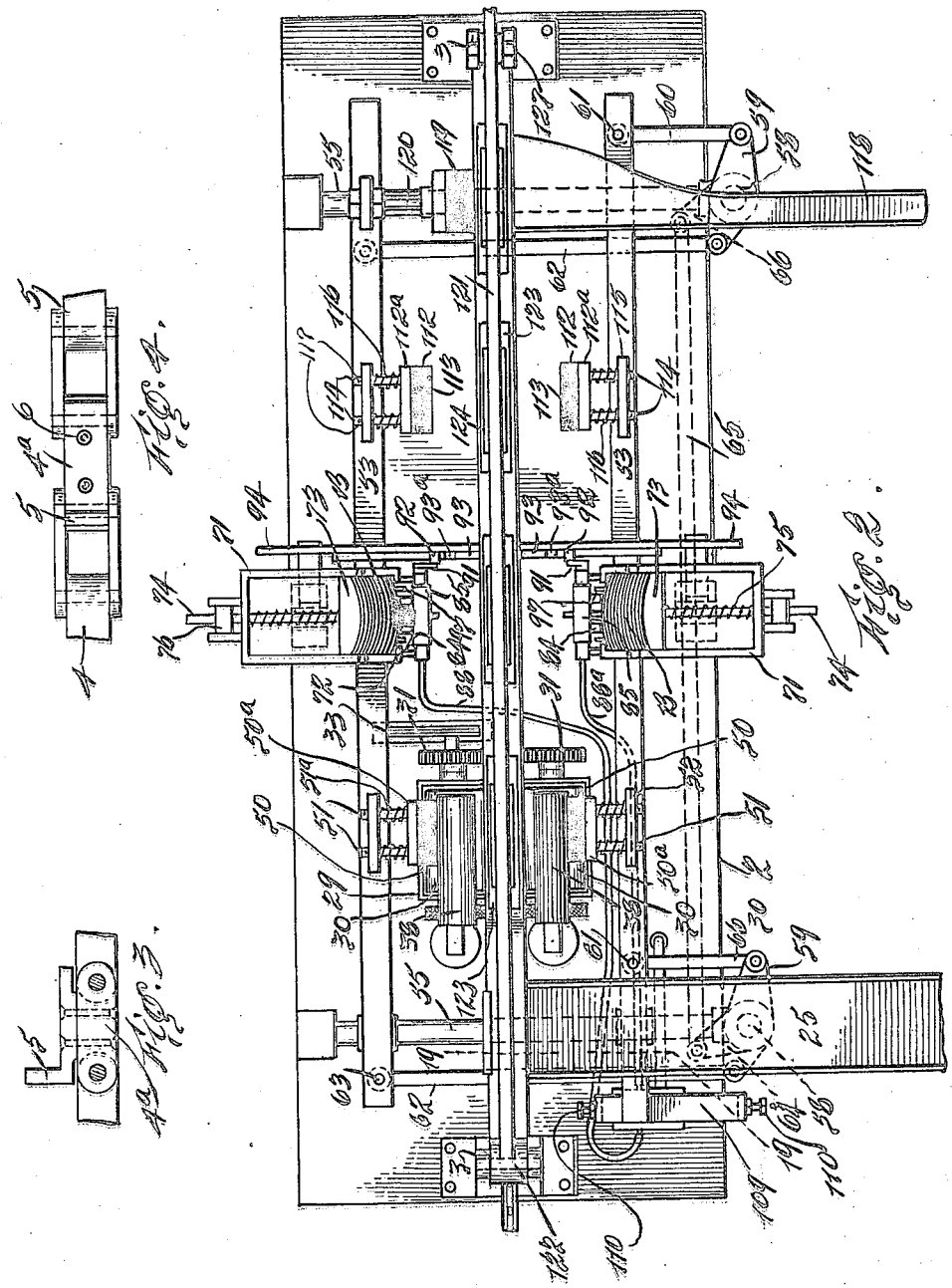

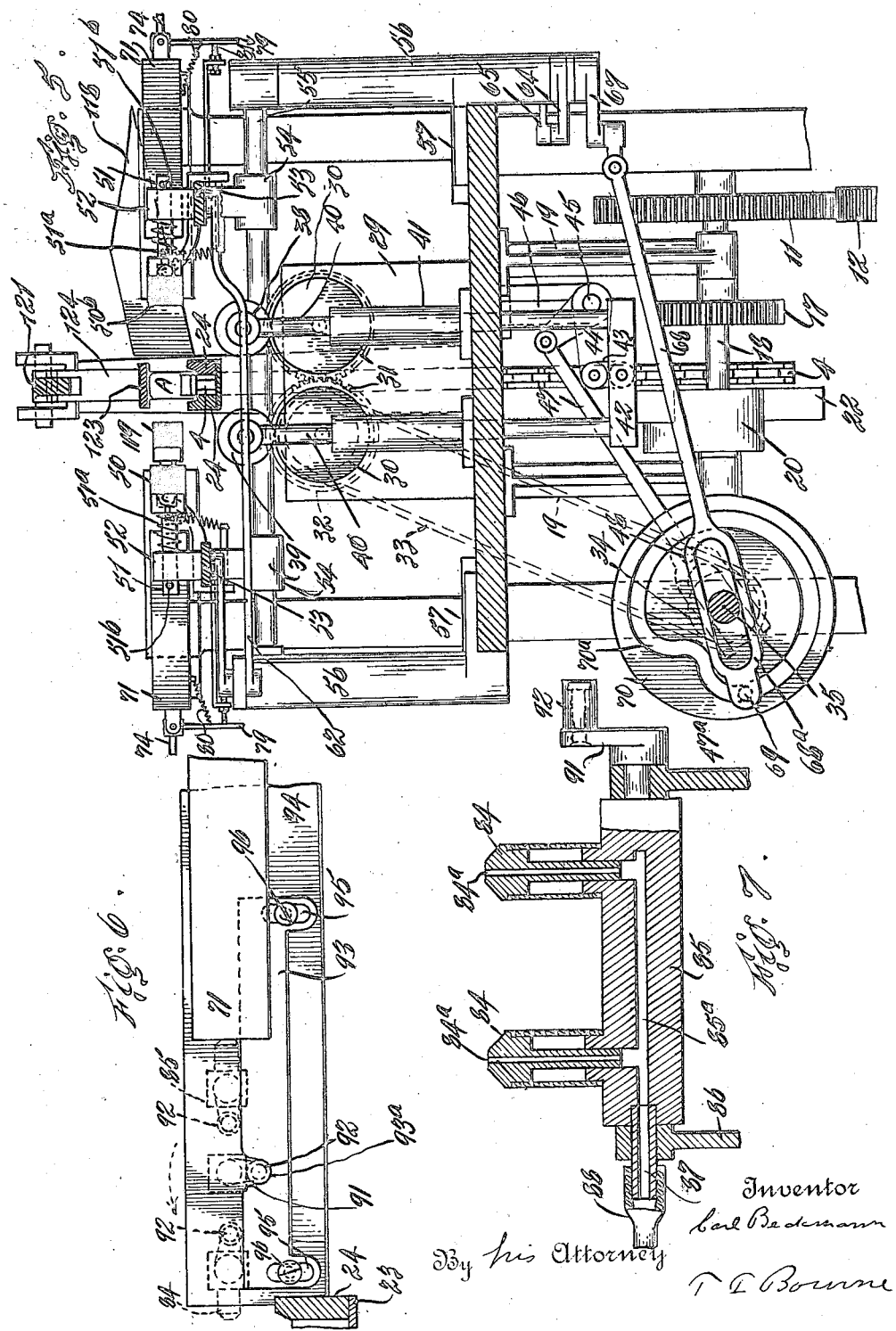

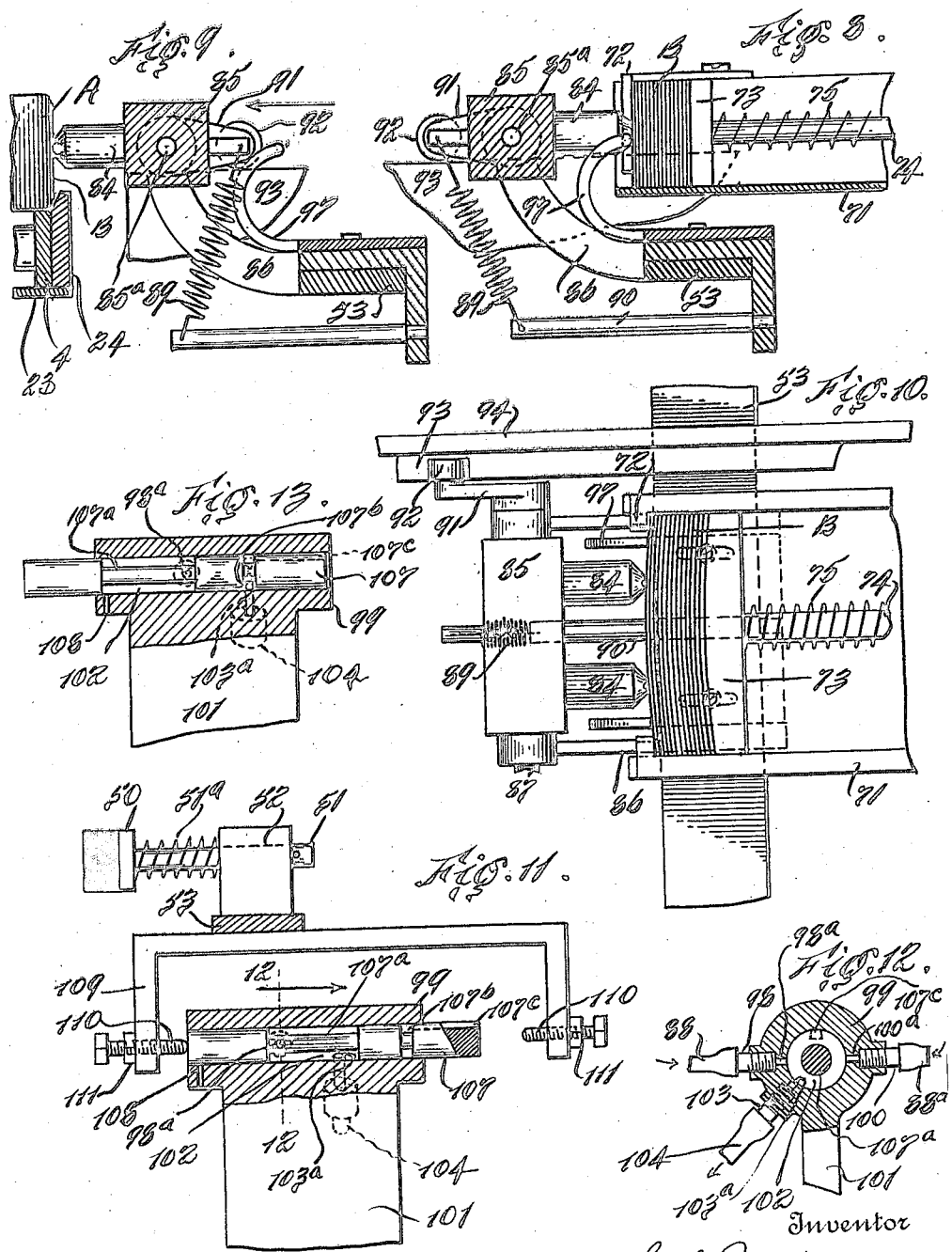

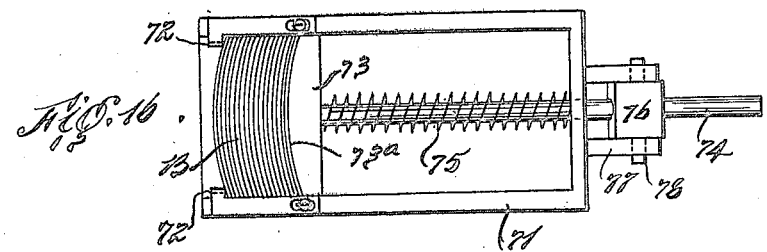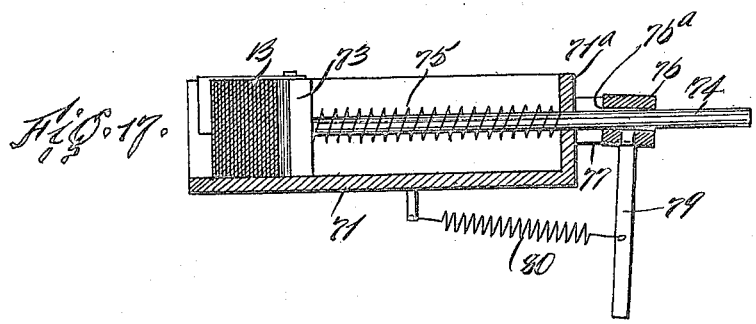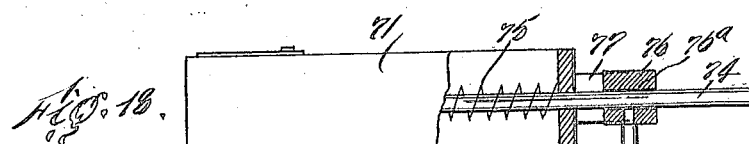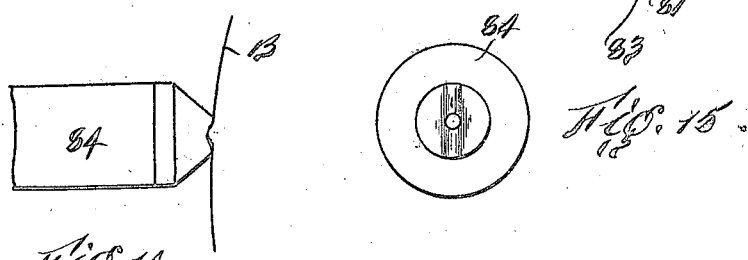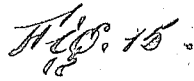

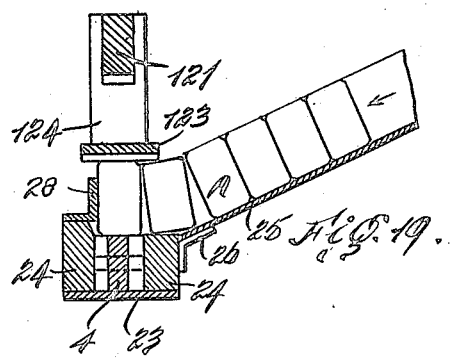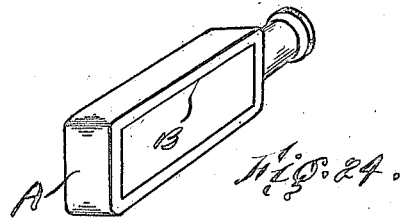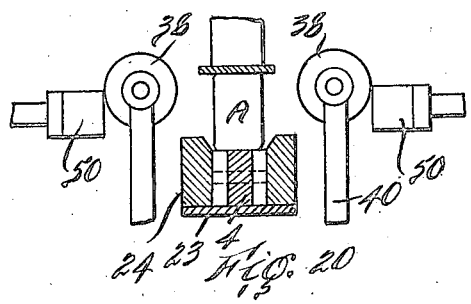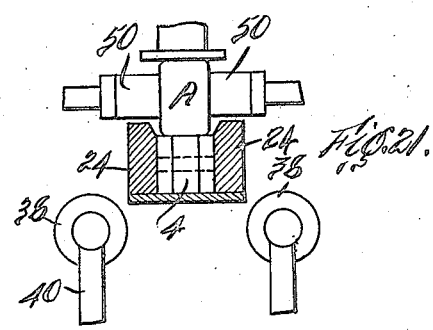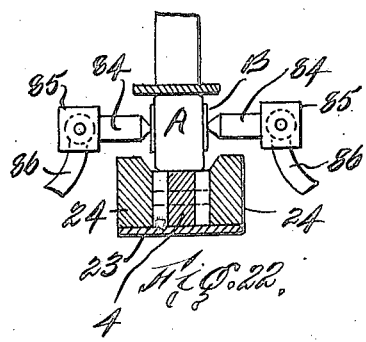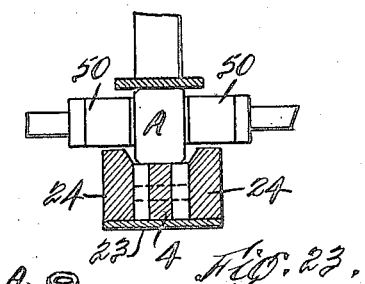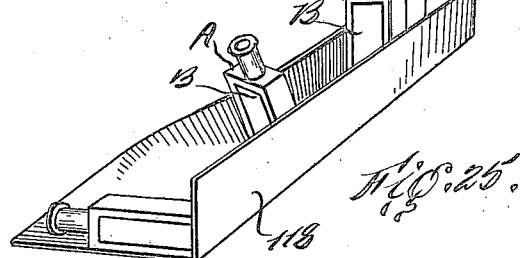

1,446,733

UNITED STATES PATENT OFFICE.

CARL BECKMANN, OF NEW YORK, N. Y., ASSIGNOR TO E. D. ANDERSON, INC., OF NEW YORK, N. Y., A CORPORATION OF NEW YORK.

LABELING MACHINE.

Application filed January 14, 1921. Serial No. 437,305.

*To all whom it may concern:*

Be it known that I, CARL BECKMANN, a citizen of Germany, and resident of New York city, in the county of Queens and State of New York, have invented certain new and useful Improvements in Labeling Machines, of which the following is a specification.

The object of this invention is to apply labels upon receptacles, such as bottles, in a successive manner.

One of the features of this invention comprises means to lift or remove labels successively from a stack of labels and successively apply the labels to the receptacles.

This invention comprises novel details of improvement and combination of parts that will be more fully hereinafter set forth and then pointed out in the claims.

Reference is to be had to the accompanying drawings forming part hereof, wherein—

Fig. 1 is a side elevation of a machine embodying this invention, portions being omitted; Fig. 2 is a plan view; Figs. 3 and 4 are enlarged detail views of a portion of a conveyer for the receptacles; Fig. 5 is a cross-section on the line 5, 5 in Fig. 1; Fig. 6 is an enlarged detail view illustrating diagrammatically parts of the pneumatic label transferring and applying devices; Fig. 7 is an enlarged detail section of part of the last named devices; Fig. 8 is a detail sectional view of parts of the label magazine and label transferring devices; Fig. 9 is a view similar to part of Fig. 8 illustrating a different position of transferring devices in applying a label to a receptacle; Fig. 10 is a plan view of Fig. 8; Fig. 11 is a sectional view of the air controlling valve for the label transferring devices; Fig. 12 is a section on line 12, 12 in Fig. 11; Fig. 13 is a fragmentary view corresponding to part of Fig. 11, showing the air valve in a different position; Fig. 14 is a detail side view and Fig. 15 is an end view of a label removing member; Fig. 16 is a plan view of the magazine for labels; Fig. 17 is a longitudinal section of Fig. 16; Fig. 18 is a partly sectional side view of parts shown in Fig. 16; Fig. 19 is a section substantially on line 19, 19 in Fig. 2; Figs. 20 and 21 are sectional details illustrating means for applying adhesive to the receptacles; Fig. 22 is a sectional detail illustrating the position of parts when the labels are being applied on opposite sides of a receptacle; Fig. 23 is a similar view illustrating means for finally affixing the labels on the receptacles; Fig. 24 is a perspective view of a receptacle showing the label as applied thereon; Fig. 25 illustrates the delivery chute for the labeled receptacles.

Similar numerals of reference indicate corresponding parts in the several views.

While a principal feature of this invention relates to means for applying labels to receptacles successively the machine illustrated in the accompanying drawings comprises means to feed receptacles, means to apply paste upon the receptacles preparatory to receiving the labels, and means to deliver the labeled receptacles successively.

In the accompanying drawings the numeral 1 indicates the main frame of the machine, the same being shown provided with legs $1^a$ and a table-like portion 2 having uprights 3 at opposite ends of the machine. A conveyer is indicated at 4, shown in the form of an endless chain, having spaced stops or receivers 5 to propel receptacles or containers A on and with the conveyer. The stops or receivers 5 are shown in the form of plates or blocks secured upon the blocks $4^a$ of the conveyer, as by rivets or screws 6, (Figs. 3 and 4). The conveyer is shown passing over idle sprocket wheels 7 journaled upon uprights 3, over sprocket wheel 8 and over sprocket wheel 9 loose on a shaft 10 shown journaled upon legs $1^a$. Shaft 10 is provided with a gear 11 in mesh with drive pinion 12 carried by drive shaft 13 journaled upon legs $1^a$ and having a pulley 14 receiving belt 15 from a suitable source of power for driving the machine. In the example illustrated the conveyer is operated step by step, for which purpose shaft 10 is provided with a gear wheel 16 in mesh with a gear 17 secured to shaft 18, (Fig. 1), shown journaled in bearings in brackets 19 secured to and depending from table or plate 2, (Fig. 5). Said shaft is provided with arm 20 having projection 21 adapted to operate in radial slots $22^a$ in member 22 loose on shaft 10 and secured to sprocket 9, members 21, 22 comprising operative members of a Geneva movement. As arm 20 is continuously rotated the member 22 with sprocket 9 by means of engagement of projection 21 with slots or recesses $22^a$ will be rotated step by step to correspondingly operate the conveyer. The machine is not limited to operation of the conveyer by the step by step means described.

The upper run of the conveyer travels within a guideway for the receptacles A, which guide-way is shown comprising a bottom member or plate 23 and spaced side members or rails 24, the upper portion of the conveyer being slidably supported on plate 23 and kept from lateral movement between the side members or rails 24, (Fig. 5). The upper inner edges of the side members or rails 24 are shown reduced or inwardly tapering at 24$^a$ and the upper edges of side members 24 are above the top of the conveyer whereby the receptacles A on the conveyer will be slidably guided between the reduced portions 24$^a$ of the side members for retaining said receptacles in proper position as they are propelled, and for exposing the sides of said receptacles in position to receive the labels B.

The receptacles A may be supplied to the conveyer in successive manner by any suitable means. I have shown a chute or guideway 25 supported by the main frame and having its lower delivery end attached by the bracket 26 to the adjacent side member 24, the upper edge of which is reduced at 27 at the delivery end of said chute to permit the passage of receptacles A across said side member 24 to position upon the conveyer, (Figs. 2 and 19). At 28 is a stop upon the side member 24 opposite the chute to cause the receptacles to abut to position them upon the conveyer, (Fig. 19). With a continuous supply of receptacles in chute 25 said receptacles will pass upon the conveyer successively as the conveyer carries them along one after another.

After the receptacles have been deposited upon the conveyer suitable adhesive or paste is applied to the side or sides of the receptacles upon which a label or labels is or are to be fastened. In the example illustrated means are provided for applying adhesive and labels on opposite sides of the receptacles. A receptacle or tank 29, open at the top, is mounted upon table 2 below the upper run of the conveyer and contains rollers 30 having shafts journaled upon said receptacle and provided with intermeshing gears 31, (Fig. 2) for rotating said rollers together. Upon the shaft of one of the rollers is secured a sprocket wheel 32 receiving an endless chain 33 from a sprocket wheel 34 secured upon shaft 35 journaled in suitable bearings upon the main frame. Shaft 35 may be driven by means of a bevel pinion 36 secured on said shaft and meshing with a bevel gear 37 secured on shaft 10, (Fig. 1). Over the corresponding rollers 30 are mounted laterally movable adhesive distributing members or rolls 38 which are journaled upon rods or shafts 39 carried by reciprocative rods 40 guided in bearings 41 carried by table 2 on opposite sides of the conveyer. The rods 40 are connected together by a bar 42 (Fig. 5), shown pivotally connected by a link 43 with a bell-crank 44 pivotally supported at 45 upon a bracket 46 hung from the main frame. Said crank is shown pivotally connected with a rod or link 47 the outer end of which is shown forked at 47$^a$ and slidable upon shaft 35 which guides the rod or link. Said rod or link is provided with a projection 48 co-operative with a cam 49, as with a cam groove 49$^a$ in the face thereof, for reciprocating said link, whereby the crank 44 will be rocked to reciprocate rods 40 and rollers 38. Said rollers descend and encounter the corresponding rotating rollers 30 and receive adhesive or paste therefrom. In order to cause rotation of the rollers 38 independent of rotation of the same by contact with rollers 30, the shafts of rollers 30 are provided with knurled wheels 30$^a$ that engage the corresponding rollers 38 for rotating the latter. The rollers 38 are raised on opposite sides of the conveyer to encounter pasters 50 which are disposed on opposite sides of the receptacle A when it is brought to rest by the conveyer to receive the adhesive. The pasters 50 may comprise suitable supports 50$^a$ having pads 50$^b$ to engage rollers 38 to receive adhesive therefrom and to apply the adhesive to the sides of receptacle A. Supports 50$^a$ are shown provided with outwardly extending rods 51 slidable in heads 52 carried upon bars 53 supported on opposite sides of the conveyer. Springs 51$^a$ are shown interposed between the pasters 50$^a$ and the heads 52 to normally push the pasters 50 outwardly, pins 51$^b$ in the rods 51 engaging the heads 52 to limit such movement of the pasters, (Figs. 2 and 5). The pads 50$^b$ thus are caused to engage receptacles A in a resilient manner by reason of spring pressure against said pads. Said bars are shown provided with spaced guides 54 slidably mounted upon transverse rods 55 secured upon uprights 56 on the main frame, (Fig. 5), as by brackets 57 attached to table 2. Bars 53 are adapted to be moved toward and from the conveyer. Shafts 58 are journaled in the spaced uprights 56 on one side of the machine, the upper ends of said shafts being provided with arms 59 projecting on opposite sides of the shafts, (Fig. 2). One end of each of said arms is pivotally connected with a link 60 that is pivotally connected at 61 with the adjacent bar 53, and the other ends of said arms 59 are pivotally connected with links 62 which extend across the machine pivotally connected at 63 with bar 53 on opposite sides of the machine, (Fig. 2). The lower end of one of the shafts 58 is provided with a crank arm 64 that is pivotally connected by link 65 with crank arm 66 on the other shaft 58 whereby said shafts may be rocked equally in unison. As shafts 58 are rocked the bars 53 will be caused to approach and recede to correspondingly operate the parts carried by said bars. The shaft 58 having crank arm 64 is also provided with a crank arm 67 pivotally connected with rod 68, (Fig. 5), the opposite end of which rod is shown slotted at 68ª and slidably guided thereby upon shaft 35. Said rod is provided with a projection 69 co-operative with a cam 70 shown in the form of a groove 70ª in the face of said cam, (Fig. 5) whereby as said cam is rotated shaft 58 will be rocked to correspondingly cause the bars 53 to approach and recede. When the bars 53 with the pasters 50 thereon come to rest in a spread position the rods 40 rise and elevate the rollers 38 into engagement with the outer faces of pads 50ᵇ to apply adhesive thereto, (Fig. 20). Said rollers next descend out of the path of said pads and thereupon the bars 53 are operated to approach the conveyer so that the pads 50ᵇ with adhesive on their forward faces will engage a receptacle A then at rest upon the conveyer between said pads to apply adhesive to the opposite sides of said receptacle, (Fig. 21). Said bars 53 and pasters will next recede. Said operations occur successively for each receptacle brought to rest between the pasters 50.

After adhesive or paste has been applied upon the sides of the receptacles the latter are stepped along with the conveyer and are brought to rest between opposing magazines 71 containing the labels B. Said magazines are shown in the form of troughs open at the tops and at opposing ends and are secured above the bars 53 on opposite sides of the conveyer upon posts C on the table top 2, Fig. 5. The delivery ends of the magazine are shown provided with inturned stops or lugs 72 in the path of the labels, (Figs. 4 and 16) whereby the endmost labels are retained at the ends of the magazines. A head or plunger 73 in each magazine bears against the inner portion of the stack of labels therein, which head or plunger is upon a rod 74 projecting rearwardly through a guide-hole in the rear wall 71ª of the magazine, (Fig. 17). A spring 75 shown coiled around rod 74 bears at one end against head or plunger 73 and at the opposite end against wall 71ª and serves normally to push the head resiliently against the stack of labels with the tendency to push said labels from the magazine. The faces 73ª of heads or plungers 73 which oppose the labels are shown curved or protruding in form, having the effect to cause the labels B to protrude centrally in a convex or curved form, (Figs. 2 and 16).

Means are provided to control the feeding operation of the labels in the magazine as follows: A gripper 76 is mounted upon the corresponding rod 74, being shown in the form of a block having a hole 76ª snugly receiving said rod, (Fig. 17), which block is pivotally supported upon the corresponding magazine, (Figs. 2 and 16). The magazine is shown provided with spaced arms 77 receiving the gripper 76 therebetween, which arms support pivot pins 78 extending from the gripper block, (Fig. 16). The arrangement described is similar for each magazine. The gripper blocks have arms or projections 79 connected by springs 80 with a corresponding magazine, (Figs. 17, 18), which springs tend to tilt the gripper blocks 76 to grip the corresponding rod 74 to prevent operation of the latter and plunger 73 by spring 75 until the proper time. The arms or projections 79 are in the path of a corresponding stop 81 shown carried by adjacent bar 53 upon table 2, (Fig. 18). Stops 81 are shown in the form of screws retained by nuts 83, whereby said stops are adjustable with respect to the moment of engagement therewith of the corresponding arms or projections 79.

When the conveyer comes to rest with a pasted receptacle A between magazines 71 the end-most labels will be lifted from the magazines and bodily moved and applied against the paste on the receptacle. I have provided pneumatic operating means, operating by air suction, to remove the labels from the magazines and apply them to the pasted receptacles as follows:—In the spaces between the conveyer and the magazines 71 are located rotative and laterally movable nozzles 84 adapted to engage the labels at the ends of the adjacent magazines, suction through the nozzles serving to cause the labels to adhere thereto while being transferred by the nozzles to the receptacles, so that when the suction stops the labels will be released from the nozzles. The nozzles 84 and the means to control them for causing suction therethrough are similar on opposite sides of the conveyer and a description of one will suffice for both. The nozzles 84 are shown carried by a head or block 85 that is rotatively supported by bracket 86 secured to the corresponding bar 53, Figs. 8, 9, 10, whereby the nozzles are in horizontal relation to the magazines and to the receptacles on the conveyer. The nozzles 84 have bores 84ª communicating with bore 85ª in head or block 85, the latter bore, by means of a tube or nipple 87, being connected with a flexible tube 88, (Figs. 1, 2, 7), through which tube suction may be induced. Head 85 is connected with spring 89, the opposite end of which is shown connected with bar 53 by means of rod 90 extending from bracket 86, (Figs. 8 and 9), said spring tending to rotate head 85 and its nozzle 84 in the appropriate direction. The head 85 is shown provided with a crank arm 91 shown having a roller 92 adapted to roll on a rail or guide 93 secured upon the main frame, as upon post C. The bar or guide 93 is shown provided with a recess 93ª in cam-like form, Figs. 2 and 6, to receive roller 92. The rail or guide 93 for each magazine is shown supported upon transverse bar 94 supported by post C, the rail or guide 93 being shown provided with spaced vertical slots 95, receiving screws 96 entering bar 94, whereby the rail or guide 93 may be adjusted vertically with respect to crank arm 91. When a bar 53 moves laterally from one position to another the crank arm roller 92 will ride on the corresponding rail or guide 93 with the nozzles 84 in a horizontal position until such crank arm enters recess 93ª, whereupon spring 89 will cause head 85 to rotate to draw crank arm 92 into recess 93ª and continued movement of head 85 with bar 53 will cause said head to be completely reversed in position, as from position shown in Fig. 8 to the position shown in Fig. 9, and as indicated by the dotted lines in Fig. 6, and vice versa, according to the direction of lateral movement of bar 53. When bar 53 is moved laterally the corresponding nozzle 84 will be moved from label receiving position of Fig. 8 to label delivery position of Fig. 9, and reversely. Fingers 97 carried by bar 53 and shown in reversed hook-like form in Figs. 8 and 9, are adapted to bear against the end-most label B in magazine 71 when the corresponding nozzles 84 are in label receiving position, Fig. 8, to bear against the end-most label when the nozzles engage the same, said fingers serving to resist swinging movements of such label when it has been dragged past the stops 72 at the end of the magazine. The tube 88 from one of the heads 85 leads to a nipple 98 on a valve casing 99, and the tube 88ª from the other head 85 leads to a nipple 100 on said valve casing, Figs. 1 and 12. Said valve casing is shown supported by post 101 on table top 2. The nipples 98 and 100 respectively communicate through ports 98ª and 100ª with the vacuum chamber 102 in casing 99, and a nipple 103 communicates with port 103ª leading to said chamber, Figs. 11 and 12. Nipple 103 is connected by pipe 104 with a suitable vacuum pump or exhaust apparatus 105, which may be driven by any suitable means, such as a motor 106, (Figs. 1 and 11, 12). Within vacuum chamber 102 is a slidable valve 107, (Figs. 11, 12, 13) adapted to control the ports 98ª, 100ª and 103ª. Valve 107 is shown provided with an elongated recessed portion at 107ª, and with a smaller recessed portion 107ᵇ, spaced therefrom. Said valve is also shown provided with a longitudinal groove 107ᶜ that extends from the end of the valve to the recess at 107ᵇ, Fig. 11. Casing 99 is shown provided at one end with a bleed port 108 to communicate with vacuum chamber 102. Valve 107 is adapted to be moved longitudinally in vacuum chamber 102 to place ports 98ª, 100ª, 103ª, simultaneously in communication with the vacuum pump 105 when the valve is in the position shown in Fig. 11, and to cut off communication of ports 98ª, 100ª with port 103ª and place recess 107ᵇ in communication 103ª and place recess 107ᵇ when the valve is in another position, as in Fig. 13, at which time bleed 108 will communicate with chamber 102 at the recess 107ª of valve 107. The adjacent bar 53 is shown provided with a bracket 109 having arms extending on opposite sides of valve 107, Fig. 11, adjustable stops, shown in the form of screws 110 on said brackets, opposing valve 107 to operate the same. Said screw stops may be adjusted to engage valve 107 at the desired moment and may be retained in set position by nuts 111. When the valve 107 is in the position shown in Fig. 11 the nozzles 84 will be in a position opposing the adjacent magazine and suction will be maintained through ports 98ª and 100ª and through the corresponding tubes 88 and 88ª, to maintain suction in the corresponding nozzles 84, so that when said nozzles are pressed against the end-most label in a magazine 71 the suction through such nozzles will cause such label to adhere thereto. When the corresponding bar 53 is next moved toward the conveyer the nozzles will travel with such bar and draw the label, by the vacuum through said nozzles, from the magazine, continued movement of bar 53 with the nozzles causing said nozzles to be reversed in position and to press the label against the pasted receptacle A on the conveyer, Fig. 9. As the label is being moved toward the bottle the valve 107 will be shifted from the position shown in Fig. 11 to the position shown in Fig. 13, so that at the time the label is pressed against the receptacle by nozzles 84 the valve 107 will have been so shifted, by the movement of the corresponding stop 110 with bar 53, as to shut off the suction through chamber 102 from the vacuum pump and place recess 107ᵇ of valve 107 opposite port 103ª, so that the influence of suction to the pump from the recessed part 107ª of said valve will be stopped, and thereupon suction or exhaust in the nozzles will be relieved through bleed 108, so that the nozzles will release the label then against the pasted side of the receptacle A. At such time air may flow through passage 107ᶜ of valve 107 to check the tendency to the forming of a vacuum in the recess 107ª of the valve. When bar 53 next moves towards the adjacent magazine 71 the corresponding stop 110, at the left in Fig. 11, will engage the left hand end of valve 107 to push said valve from the position shown in Fig. 13 to the position shown in Fig. 11, during which movement of bar 53 the nozzles 84 will be reversed from the position shown in Fig. 9 to be pressed, as in Fig. 8, toward the magazine, the recess 107ª being brought into communication simultaneously with ports 98ª, 100ª and 103ª, for the creation of suction in recess 107ª of valve 107 at or before the time that the nozzles engage the end-most label in the magazine. From what has been described it will be understood that each time the nozzles 84 are reciprocated they will engage a label, withdraw it from the magazine, transfer the label to the receptacle A, release the label on the receptacle, which will remain adhering to the paste thereon, and will then return for a label for the succeeding receptacle on the conveyer, and so on.

Each time a bar 53 moves outwardly its stop 81 will engage the adjacent arm 79 to tilt its gripper 76 to release rod 74 and permit spring 75 to act to push the labels in the magazine toward stop 72, Fig. 18. When stop 81 moves away from arm 79 block 80 will be tilted to grasp and retain rod 74 to stop movement of the labels in the magazine.

After the labels have been applied upon the sides of the receptacles, as last described, the conveyer comes to rest with the receptacles having the labels in position opposite pads 112 operable to press the labels finally against the pasted surfaces of the receptacles. The pads 112 are shown comprising preferably, flexible pad portions, such as felt 113, carried by blocks 112ª having outwardly projecting rods or pins 114 guided in holes in blocks 115 secured on the bars 53. Pads 112 are shown pressed toward the receptacles by springs 116 bearing against blocks 112ª and 115, pins 117 in the rods 114 limiting movement of the pads toward the receptacles, enabling the latter to be engaged resiliently by the pads, (Fig. 2). When the receptacle A comes to rest between pads 112, with labels adhering to the sides of the receptacle, the bars 53 will approach the receptacles, as before described, and will cause said pads to press the labels against the sides of the receptacles to affix the labels finally thereto with suitable pressure.

The labeled receptacles may be removed from the machine in any suitable manner. I have shown a delivery guide 118 in the form of an open top trough or chute supported at one side of the stopping position of the conveyer with the labeled receptacles. As the labeled receptacles are successively brought to rest by the conveyer opposite the receiving end of the guideway or chute 118 a reciprocative plunger 119 is provided to push the receptacles from the conveyer into said guide or chute. Said plunger is shown in the form of a block preferably having a pad at its end, such as of felt to engage the labeled receptacles, which block is shown carried by rod 120 secured to bar 53 on the side of the conveyer opposite guide 118. The receptacles may be removed from the guide or chute 118 in any suitable way.

In order to keep the receptacles from rising from the conveyer during their travel thereon and to enable ready access to the receptacles upon the conveyer, a bar 121 is pivotally supported at one end, as at 122, upon one of the uprights 3 and extends at a suitable height over the conveyer, the free end of the bar being received in the upright 3 at the opposite end of the machine, whereby the bar is pivotally retained at a suitable height over the conveyer. The bar 121 has means depending over the conveyer and spaced therefrom to permit free passage of the receptacles A, such means being shown in the form of shoes or strips 123 suspended from bar 121 by hangers 124, which may be secured to the bar by screws 125. The hangers 124 are shown provided with slots 126 receiving said screws, whereby the shoe may be adjusted and retained in desired position over the receptacles on the conveyer. The free end of the bar 121 may be retained attached to upright 3 by means of screw 127 carried by said bar and received in the slotted end of upright 3, (Figs. 1 and 4). One of the shoes or strips 123 is shown located over the conveyer where the receptacles are delivered to the conveyer and where the pasting of the receptacles is effected, and the other of such shoes or strips are shown located over the stopping points of the conveyer where the labels are applied to the receptacles, pressed thereon, and the labeled receptacles delivered to the guide or chute 118, to keep the receptacles from rising from the conveyer when operations are performed on the receptacles. By raising the bar 121 the top run of the conveyer and the receptacles thereon are exposed to permit removal and the replacing of the receptacles, and for other purposes.

While I have shown two nozzles 84 operable with a label, it will be understood that one or more such nozzles may be used if desired.

Having now described my invention, what I claim is:

1. A labeling machine comprising means to support receptacles, a magazine for labels having an open portion to expose the labels, means to apply adhesive between the labels and the receptacles, a nozzle to engage the labels, a head carrying the nozzle, means pivotally supporting the head, means to reciprocate the head and nozzle between the magazine and the receptacles, an arm connected with the head, a guide for said arm provided with a recess to cause the arm to rock the head and nozzle, a spring carried by the bar and cooperating with said head at one side of its axis to cause the arm to cooperate with said recess and means to induce suction in the nozzle and cut off suction therefrom for transferring labels from the magazine to the receptacles.

2. A labeling machine comprising means to support receptacles, a magazine for labels having an open portion to expose the labels, means to apply adhesive between the labels and the receptacles, a nozzle to engage the labels, a head having a bore communicating with the nozzle, means to reciprocate the nozzle and head between the magazine and the receptacles, means to cause the nozzle to be presented to the labels and to the receptacles, successively, a valve casing, a valve movable in the casing, said casing having a port, a tube providing communication between said port and the nozzle, said casing having a second port, vacuum inducing means communicating with the second port, said valve having means to place both of said ports in communication and cut off such communication, and means to operate said valve to alternately provide communication between said ports and cut off such communication.

3. A labeling machine comprising means to support receptacles, a magazine for labels having an open portion to expose the labels, means to apply adhesive between the labels and the receptacles, a nozzle to engage the labels, a head having a bore communicating with the nozzle, means to reciprocate the nozzle and head between the magazine and the receptacles, means to cause the nozzle to be presented to the labels and to the receptacles successively, a valve casing, a valve movable in the casing, said casing having a port, a tube providing communication between said port and the nozzle, said casing having a second port, vacuum inducing means communicating with the second port, said valve having means to place both of said ports in communication and cut off such communication, and means to operate said valve to alternately provide communication between said ports and cut off such communication, said valve having a recess to communicate with the second named port when said ports are not in communication, said recess communicating with atmosphere.

4. A labeling machine comprising means to support receptacles, a magazine for labels, having an open portion to expose the labels, means to apply adhesive between the labels and the receptacles, a nozzle to engage the labels, a head having a bore communicating with the nozzle, means to reciprocate the nozzle and head between the magazine and the receptacles, means to cause the nozzle to be presented to the labels and to the receptacles successively, a valve casing, a valve movable in the casing, said casing having a port, a tube providing communication between said port and the nozzle, said casing having a second port, vacuum inducing means communicating with the second port, said valve having means to place both of said ports in communication and cut off such communication, and means to operate said valve to alternately provide communication between said ports and cut off such communication, said casing having a bleed controlled by the valve to be placed in communication with the first named port when said ports are not in communication.

5. A labeling machine comprising means to support receptacles, a magazine for the labels having an open portion to expose the labels, means to apply adhesive between the labels and the receptacles, a nozzle to engage the labels, a head having a bore communicating with the nozzle, a bar, means to reciprocate the bar, said bar having means pivotally supporting said head, means to cause the head and nozzle to reverse their position between the labels and the receptacles, a valve casing, a valve movable in the casing, said casing having a port, a tube providing communication between said port and the nozzle, said casing having a second port, vacuum inducing means communicating with the second port, said valve being slidable in said casing and having a recess to communicate with both of said ports simultaneously, and means upon said bar to reciprocate said valve during the reciprocations of the nozzle to cause communication between said ports when the nozzle engages a label and to cut off said communication between said ports when the nozzle presents a label against the receptacle.

6. A labeling machine comprising means to support receptacles, a magazine for labels having an open portion to expose the labels, means to apply adhesive between the labels and the receptacles, a nozzle to engage the labels, a head having a bore communicating with the nozzle, a bar, means to reciprocate the bar, said bar having means pivotally supporting said head, means to cause the head and nozzle to reverse their position between the labels and the receptacles, a valve casing, a valve movable in the casing, said casing having a port, a tube providing communication between said port and the nozzle, said casing having a second port, vacuum inducing means communicating with the second port, said valve being slidable in said casing and having a recess to communicate with both of said ports simultaneously, and means upon said bar to reciprocate said valve during the reciprocations of the nozzle to cause communication between said ports when the nozzle engages a label and to cut off said communication between said ports when the nozzle presents a label against the receptacle, said receptacle having a bleed to communicate with said recess when the valve is in the last named position.

7. A labeling machine comprising means to support receptacles, a magazine for labels having an open portion to expose the labels, means to apply adhesive between the labels and the receptacles, a nozzle to engage the labels, a head having a bore communicating with the nozzle, a bar means to reciprocate the bar, said bar having means pivotally supporting said head, means to cause the head and nozzle to reverse their position between the labels and the receptacles, a valve casing, a valve movable in the casing, said casing having a port, a tube providing communication between said port and the nozzle, said casing having a second port, vacuum inducing means communicating with the second port, said valve being slidable in said casing and having a recess to communicate with both of said ports simultaneously, and means upon said bar to reciprocate said valve during the reciprocations of the nozzle to cause communication between said ports when the nozzle engages a label and to cut off said communication between said ports when the nozzle presents a label against the receptacle, said valve having a second recess to communicate with the second named port when said valve is in the last named position.

8. A labeling machine comprising a conveyer, means to operate the conveyer, means on opposite sides of the conveyer to apply adhesive to opposite sides of receptacles thereon, magazines for labels on opposite sides of the conveyer, nozzles on opposite sides of the conveyer between the latter and the corresponding magazine, means to reciprocate said nozzles between the conveyer and the corresponding magazine, means to cause said nozzles to alternately engage labels in the magazines and present them against the receptacles therebetween on the conveyer, a valve casing having ports, conduits providing communication between said ports and nozzles respectively, a valve movable in said casing and provided with a recess to communicate with said ports simultaneously, said casing having a third port, vacuum inducing means communicating with said third port, the recess in said valve being adapted to communicate with all of said ports simultaneously when the nozzles engage the labels in the magazines, said valve having a portion adapted to close the third named port to cut off suction from the nozzles when the latter present the labels against the receptacles, and means to operate said valve.

9. A labeling machine comprising a conveyer, means to operate the conveyer, means on opposite sides of the conveyer to apply adhesive to opposite sides of receptacles thereon, magazines for labels on opposite sides of the conveyer, nozzles on opposite sides of the conveyer between the latter and the coresponding magazine, means to reciprocate said nozzles between the conveyer and the corresponding magazine, means to cause said nozzles to alternately engage labels in the magazines and present them against the receptacles therebetween on the conveyer, a valve casing having ports conduits providing communication between said ports and nozzles respectively, a valve movable in said casing and provided with a recess to communicate with said ports simultaneously, said casing having a third port, vacuum inducing means communicating with said third port, the recess in said valve being adapted to communicate with all of said ports simultaneously when the nozzles engage the labels in the magazines, said valve having a portion adapted to close the third named port to cut off suction from the nozzles when the latter present the labels against the receptacles, and means to operate said valve, said valve having a second recess communicating with the atmosphere to communicate with said third port when the valve is in the last named position, and means to operate said valve.

10. A labeling machine comprising a conveyer, means to operate the conveyer, means on opposite sides of the conveyer to apply adhesive to opposite sides of receptacles thereon, magazines for labels on opposite sides of the conveyer, nozzles on opposite sides of the conveyer between the latter and the corresponding magazine, means to reciprocate said nozzles between the conveyer and the corresponding magazine, means to cause said nozzles to alternately engage labels in the magazines and present them against the receptacles therebetween on the conveyer, a valve casing having ports, conduits providing communication between said ports and nozzles respectively, a valve movable in said casing and provided with a recess to communicate with said ports simultaneously, said casing having a third port, vacuum inducing means communicating with said third port, the recess in said valve being adapted to communicate with all of said ports simultaneously when the nozzles engage the labels in the magazines, said valve having a portion adapted to close the third named port to cut off suction from the nozzles when the latter present the labels against the receptacles, and means to operate said valve, said casing having a bleed to communicate with said recess of the valve when the valve is in the last named position.

11. A labeling machine comprising a conveyer, means to operate the conveyer, means on opposite sides of the conveyer to apply adhesive to opposite sides of receptacles therein, magazines for labels on opposite sides of the conveyer, bars on opposite sides of the conveyer, means to reciprocate said bars relatively to the conveyer and magazines, nozzles pivotally carried by said bars, means to cause said nozzles to rotate to be alternately presented to the adjacent magazine and on opposite sides of the receptacle on the conveyer, a valve casing having ports respectively communicating through conduits with said nozzles, a valve slidable in said casing and having a recess to communicate with said ports simultaneously, said casing having a third port adapted to communicate with said recess and means upon one of said bars to reciprocate said valve to alternately cause said recess to communicate with said third port and cut off communication therewith and means to induce suction through said third port.

12. A labeling machine comprising a conveyer, means to operate the conveyer, means on opposite sides of the conveyer to apply adhesive to opposite sides of receptacles therein, magazines for labels on opposite sides of the conveyer, bars on opposite sides of the conveyer, means to reciprocate said bars relatively to the conveyer and magazines, nozzles pivotally carried by said bars, means to cause said nozzles to rotate to be alternately presented to the adjacent magazine and on opposite sides of the receptacle on the conveyer, a valve casing having ports respectively communicating through conduits with said nozzles, a valve slidable in said casing and having a recess to communicate with said ports simultaneously, said casing having a third port adapted to communicate with said recess and means upon one of said bars to reciprocate said valve to alternately cause said recess to communicate with said third port and cut off communication therewith and means to induce suction through said third port, said valve having a second recess communicating with the atmosphere to register with the third port when the latter is out of register with the recess of said valve.

13. A labeling machine comprising a conveyer, means to operate the conveyer, means on opposite sides of the conveyer to apply adhesive to opposite sides of receptacles therein, magazines for labels on opposite sides of the conveyer, bars on opposite sides of the conveyer, means to reciprocate said bars relatively to the conveyer and magazines, nozzles pivotally carried by said bars, means to cause said nozzles to rotate, to be alternately presented to the adjacent magazine and on opposite sides of the receptacle on the conveyer, a valve casing having ports respectively communicating through conduits with said nozzles, a valve slidable in said casing and having a recess to communicate with said ports simultaneously, said casing having a third port adapted to communicate with said recess and means upon one of said bars to reciprocate said valve to alternately cause said recess to communicate with said third port and cut off communication therewith and means to induce suction through said third port, said casing having having a bleed to communicate with the recess of said valve when said recess is out of register with the third named port.

Signed at New York city, in the county of Queens, and State of New York, this 7th day of January A. D. 1921.

CARL BECKMANN.